(12) United States Patent
Funk

(10) Patent No.: US 6,974,048 B2
(45) Date of Patent: Dec. 13, 2005

(54) SAFETY TOOL FOR CONTAINING DEBRIS FROM ELECTRICAL WORK

(75) Inventor: James Edwin Funk, 904 N. First Ave., Upland, CA (US) 91786

(73) Assignees: James Edwin Funk, Ontario, CA (US); Michael Alan Fell, Ontario, CA (US); Ronald Michael Perry, Ontario, CA (US)

(*) Notice: Subject to any disclaimer, the term of this patent is extended or adjusted under 35 U.S.C. 154(b) by 0 days.

(21) Appl. No.: 10/648,578

(22) Filed: Aug. 25, 2003

(65) Prior Publication Data

US 2004/0040106 A1  Mar. 4, 2004

Related U.S. Application Data

(60) Provisional application No. 60/406,369, filed on Aug. 28, 2002.

(51) Int. Cl.[7] .............................................. B65D 33/14
(52) U.S. Cl. ........................ 220/495.06; 220/495.01; 206/818; 383/11; 383/33
(58) Field of Search ................... 383/11, 33; 224/562, 224/183; 206/818; 220/495.06, 495.08, 495.01

(56) References Cited

U.S. PATENT DOCUMENTS

| | | | | |
|---|---|---|---|---|
| 2,875,802 A | * | 3/1959 | Koret | 150/115 |
| 4,660,715 A | * | 4/1987 | Anastos | 206/0.8 |
| 4,872,401 A | * | 10/1989 | Lee | 99/275 |
| 5,367,278 A | * | 11/1994 | Yoshikawa | 335/285 |
| 5,636,871 A | * | 6/1997 | Field | 383/33 |
| 5,871,114 A | * | 2/1999 | Anderson et al. | 220/495.11 |
| 6,179,025 B1 | * | 1/2001 | Sutton | 150/105 |
| 6,505,967 B1 | * | 1/2003 | Alfero-Kuronya | 383/11 |
| 2002/0025086 A1 | * | 2/2002 | Crawley | 383/33 |

OTHER PUBLICATIONS

Merriam-webster's Collegiate Dictionary, Tenth Edition, Copyright 1997. pp. 1078 and 1359.*

* cited by examiner

Primary Examiner—Joseph C. Merek
(74) Attorney, Agent, or Firm—Hickman Palermo Truong & Becker LLP

(57) ABSTRACT

A safety tool includes magnets and an outer non-conductive sheath encompassing an inner bag. A purpose of the tool is to provide safety for the operator while drilling or cutting into electrical/electronic enclosures, such as switchgear. The tool is constructed so that an operator can perform a task while preventing any conductive debris caused by this task to come in contact with any electrical or electronic parts. The top portion of the tool magnetically attaches to the inside of the switchgear structure. The bottom portion of the tool, which is coupled to the top portion by the non-conductive sheath, collects and magnetically contains the debris, such as shavings from drilling into the structure. Specifically, the debris is collected in the inner bag, which can easily be removed from the tool for disposal of the debris.

13 Claims, 4 Drawing Sheets

SAFETY TOOL FOR CONTAINING DEBRIS FROM ELECTRICAL WORK

CROSS REFERENCE TO RELATED APPLICATION

This application is related to and claims the benefit of domestic priority under 35 U.S.C. §119(e) from U.S. Provisional Patent Application No. 60/406,369 entitled "Safety Pouch For Drilling Into Live Electrical Switchgear," filed on Aug. 28, 2002; which is incorporated by reference in its entirety for all purposes, as if fully set forth herein.

FIELD OF THE INVENTION

The present invention generally relates to safety equipment for the electrical/electronics field. The invention relates more specifically to a safety tool for use in drilling into live switchgear or other electrical equipment.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Electricians have been working on hot or live switchgear for many years. There are many instances, for example, hospitals, large factories and numerous businesses, that require electricians to work and install equipment and conduits into live switchgear without de-energizing it first.

There has never been a safe and ideal way of installing conduits in hot or live switchgear without turning the electrical off at the source. The process of drilling into live or hot switchgear produces debris that is extremely hazardous to the operator, should any of debris accidentally fall inside a breaker or an electrical switch inside the switchgear, hence causing an explosion.

There are no known tools designed to address this safety issue. Usually, an operator will use a piece of cardboard or a rubber blanket to try to insulate the electrical components from the debris caused by drilling into the switchgear. Typically, this task is performed with a two-step approach: (1) a small hole is drilled by using a unibit to cut a hole about 1" in diameter; and (2) a hole punch is used to punch the appropriate sized hole to finish the task. The first step is very dangerous. If the shavings from the unibit fall into the live or hot components of the switchgear, an explosion may occur, which can cause very serious injury to the operator and at times can be fatal.

The practice of working on live or hot switchgear is not new, but has often made electricians uneasy. The very nature of the work of an electrician around live or hot switchgear is often a tense moment, especially when drilling holes into the metal housing of the switchgear. The act of cutting the hole, whether one uses an unibit or holesaw, is a large aspect of the task. Although cutting the hole might appear to be the most dangerous aspect of the task, the removal of the debris by means of a makeshift apparatus is just as hazardous, if not more. A make-shift apparatus is very difficult to make so as to limit the possibility of errors. Furthermore, no matter what type of apparatus one uses, the debris is never secured in a proper method for easy disposal.

Another challenge that is even greater is that of drilling into live or hot switchgear that has very limited space due to existing wiring that has been routed in such a way that it cannot be moved, or that has switchgear components that cannot be removed.

The operations of drilling into live or hot switchgear is not likely to diminish but, on the contrary, to grow more and more prevalent seeing how our present culture is more geared to optimum production and technology. With factories producing materials around the clock and technology growing at the fastest rate, shutting down switchgear to enable safe conditions is becoming less and less likely.

Due to the foregoing factors, only the very experienced electricians are called to perform these duties. When accidents occur, a very well trained and experienced trade man is lost and the explosion causes great cost and loss to the company, the contractor and the insurance companies.

The safety tool of this application would make this unsafe and hazardous operation, one of the safest operations that an electrician could perform around live or hot switchgear. This safety measure while providing an enhanced sense of security to the electrician would also ensure the business owner a peace of mind, knowing that all safety measures that are available are being used. This safety tool not only limits the possibility of danger during the act of drilling into the switchgear, but also in the removal of the debris and disposal of debris after the operation is over. The tool is also designed to be totally non-conductive and to retain the debris in the event that the tool were accidentally dropped during its removal.

Based on the foregoing, there is a clear need for a mechanism for facilitating work on live or hot switchgear. Further, there is a specific need for such a mechanism that limits the danger associated with drilling into switchgear. There is a further need for such a mechanism that facilitates the simple and safe removal of debris after the drilling operation is finished.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
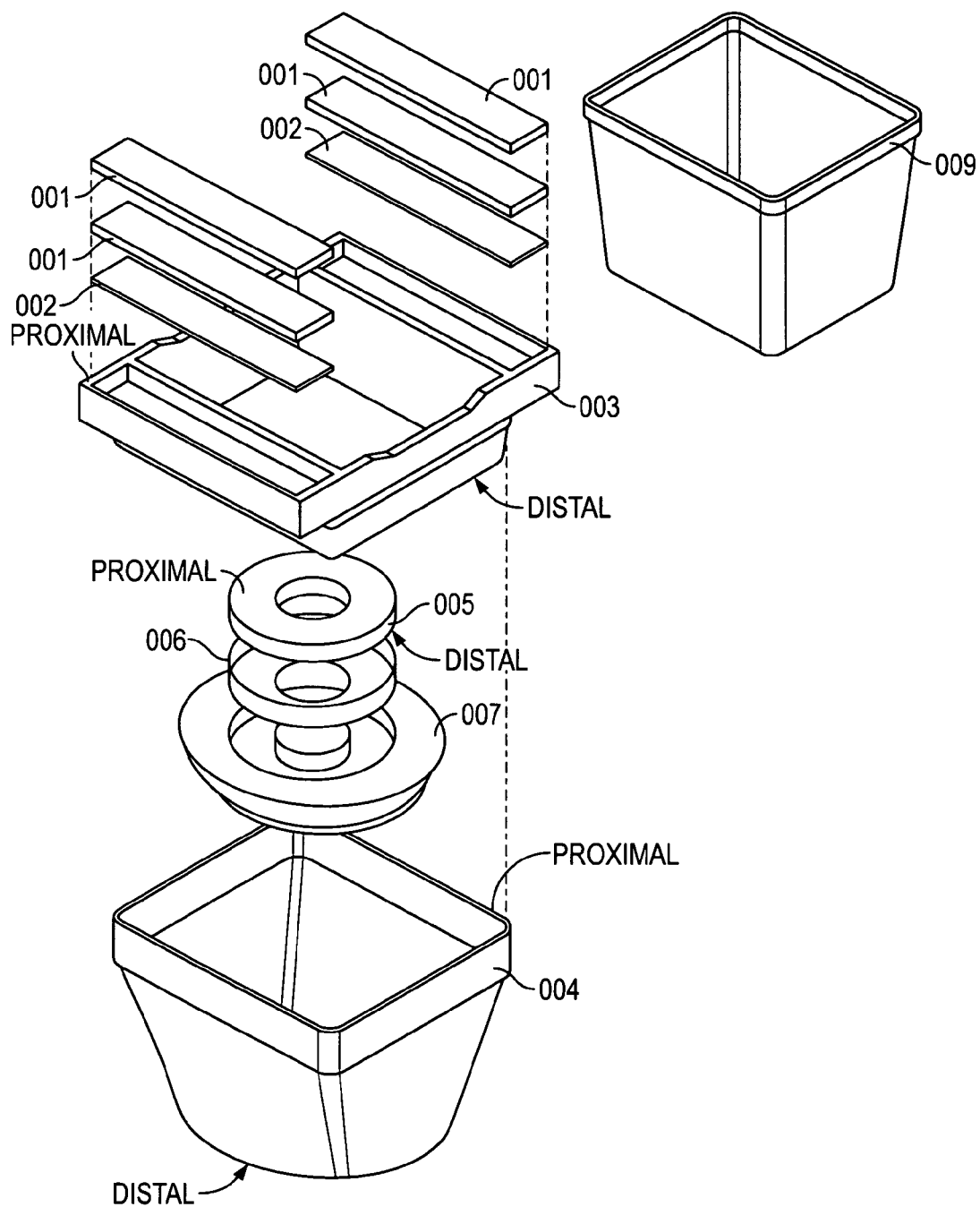
FIG. 1 is an exploded view of a safety tool for containing debris from electrical work.

A safety tool for live electrical work, such as drilling into live electrical switchgear, is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

The tool described herein is a safety device that is comprised of magnets, an outer non-conductive sheath encompassing an inner bag and support structure. The primary purpose of the tool is to provide safety for the operator while drilling into electrical/electronic enclosures, also known as switchgear. Such an enclosure may consist of any metal housing that surrounds electrical equipment or electronic parts. The tool is such that the operator can do his/her task while preventing any conductive debris caused by this task to come in contact with any electrical or electronic parts.

The tool is positioned on the inside of the switchgear, to surround the area of the switchgear outer structure, or chassis, on which drilling is to be performed. The top portion of the tool magnetically attaches to the inside of the switchgear chassis. The bottom portion of the tool, which is coupled to the top portion by the non-conductive sheath, collects and magnetically contains the debris, such as shavings from drilling into the chassis. Specifically, the debris is collected in the inner bag, which can easily be removed from the tool for disposal of the debris.

Advantages Over the Prior Art

Numerous advantages are provided through use of the safety tool, over the use of make-shift devices that are not adequate to provide safety to the operator during the task of drilling into live or hot switchgear. Such advantages include, but are not limited to the following.

1. Enables electricians to cut/drill holes into live/hot switchgear without causing potential for explosions and/or debris from contacting electrical/electronic equipment, thus causing failure of equipment. Therefore, the tool enables a safe and secure working condition for one of the most dangerous operations that electricians perform.

2. Enables more effective time management on jobs in which the above tasks are performed, now that the switchgear can remain live/hot during these operations, rather than scheduling off-peak time and/or total shutdowns of equipment while these operations are performed.

3. Enables ease and lessens time for set-up for drilling and cutting into live/hot switchgear 4. Is versatile and flexible, thereby allowing use in tight areas with high component density and limited clearance.

5. Secures debris both during the drilling/cutting operation and while debris is being removed.

6. Creates a total non-conductive environment, even in the event of an accident.

7. Is small, lightweight and compact for ease and convenience.

8. The tool is small, lightweight, and strong, having a considerable weight tolerance so that in the event that a drill bit, unibit, or even a holesaw were to fall off the drill during an operation, the safety of the operator is not compromised.

Configuration of Safety Tool

FIG. 1 is an exploded view of a safety tool 100 for live electrical work, in accordance with an embodiment of the invention. The components of the safety tool 100 include the following.

Upper or Proximal Magnet

The safety tool 100 is comprised of one or more multipole magnets 001 that allow the tool 100 to fasten to the inner surface of switchgear or other electrical or electronic equipment. The one or more magnets 001 are directional in nature so that the magnetic force, or "pull", of the magnets are to the top of the tool 100, rather than to the inside of the tool. In one embodiment, the one or more magnets 001 consist of a single magnet. In a related embodiment, the single magnet is circular in form with a hole in the middle. For example, the single magnet is ring or doughnut shaped. In another related embodiment, the single magnet is rectangular in form.

In one embodiment, the one or more magnets 001 consist of two C-shaped magnets, configured substantially in a plane and with the shapes in a mirrored configuration. The C-shaped magnets may be rounded, like the letter "C", or may be in the form of a rectangular "C". In yet another embodiment, the one or more magnets 001 consist of four rectangular magnets of substantially same shape. In this embodiment, a first magnet is configured on top of a second magnet, both of which are located in a first recessed portion of a frame 003, and a third magnet is configured on top of a fourth magnet, both of which are located in a second recessed portion of the frame 003. Each of the magnets of a set of two magnets that are located in contact with each other as described above are configured such that their magnetic forces act in the same direction, e.g., in the direction away from the middle of the tool.

In one embodiment, a metal strip 002 is laid underneath at least one of the magnets 001 to increase the pulling power of the magnets toward the top of the tool.

Frame

In one embodiment, the magnets 001 and the metal strip 002 are encased by a frame 003. In a related embodiment, the frame 003 is constructed of a highly impact resistant plastic. In another related embodiment, the frame is constructed using an injection mold process.

In the embodiment depicted in FIG. 1, the frame 003 is rectangular in form, and comprises two recessed areas for housing the magnets 001. In this embodiment, the recessed areas, and, therefore, the magnets 001 are located on substantially opposite side of an opening in frame 003.

Outer Sheath

An outer sheath 004, which is constructed of a non-conductive material, such as leather, plastic, rubber, etc., is configured over the base or distal end of the frame 003. In one embodiment, the outer sheath 004 is attached to the frame 003 with an adhesive. In one embodiment, the outer sheath 004 is slightly tapered from its proximal end to its distal end. In the embodiment depicted in FIG. 1, the proximal end of outer sheath 004 is substantially rectangular in shape and the distal end of outer sheath 004 is substantially circular in shape. Outer sheath 004 is preferably constructed of flexible material, or may be constructed of rigid material.

In one embodiment, the one or more magnets 001 are coupled directly to the outer sheath 004 rather than coupled to frame 003 which is coupled to the outer sheath 004. For example, magnets 001 may be sewn into one or more pouches near the proximal end of the outer sheath 004.

Lower or Distal Magnet

The bottom or distal portion of tool 100 functions to contain or secure debris that is created from a task performed on the switchgear or other electrical/electronic equipment. For example, when drilling through the outer housing or chassis of switchgear, which typically consists of metal sheet, metal shavings are created which tend to fall down into the switchgear. In one embodiment, tool 100 comprises a second magnet 005 that is encased in a magnet housing 007. As depicted in the embodiment of FIG. 1, the magnet 005 may be ring or doughnut shaped. In one embodiment, second magnet 005 comprises a plurality of magnets, with at least one being in contact with inner bag 008. In one embodiment, the magnet housing 007 is constructed of high impact plastic material. Magnet housing may be constructed using an inject mold process.

In one embodiment, the magnet 005 is constructed with a shield 006 adjacent to or coupled to its distal side so that it is shielded, and therefore has no magnetic energy, acting on the shielded or distal side. Magnet 005, therefore, is only magnetically active on its proximal side or face.

The bottom or distal portion of tool 100 is constructed of magnet 005, optional shield 006 and optional magnet housing 007. This distal portion of tool 100 is fastened or otherwise coupled to the inside bottom or distal end of the outer sheath 004. In one embodiment, the distal portion of tool 100 is coupled to outer sheath 004 by means of an adhesive. In one embodiment, the distal portion of tool 100 protrudes slightly through the bottom of the outer sheath 004.

In one embodiment, the second magnet 005 is coupled directly to the outer sheath 004 rather than coupled to magnet housing 007 which is coupled to the outer sheath 004. For example, magnet 005 may be fastened or adhered near the distal end of the outer sheath 004.

Inner Debris Containment Bag

An inner bag 008 functions to collect and retain/contain debris from the task discussed above. In one embodiment, inner bag 008 is constructed of a flexible plastic material. In one embodiment, inner bag 008 is constructed using an injection mold process. The inner bag 008 is located inside the top or proximal portion of the tool 100, which comprises magnet 001, frame 003 and optional metal strip 002. In one embodiment, the inner bag 008 is configured to hang down touching the distal portion of the tool 100.

Example Embodiment of the Safety Tool

Figure 2:
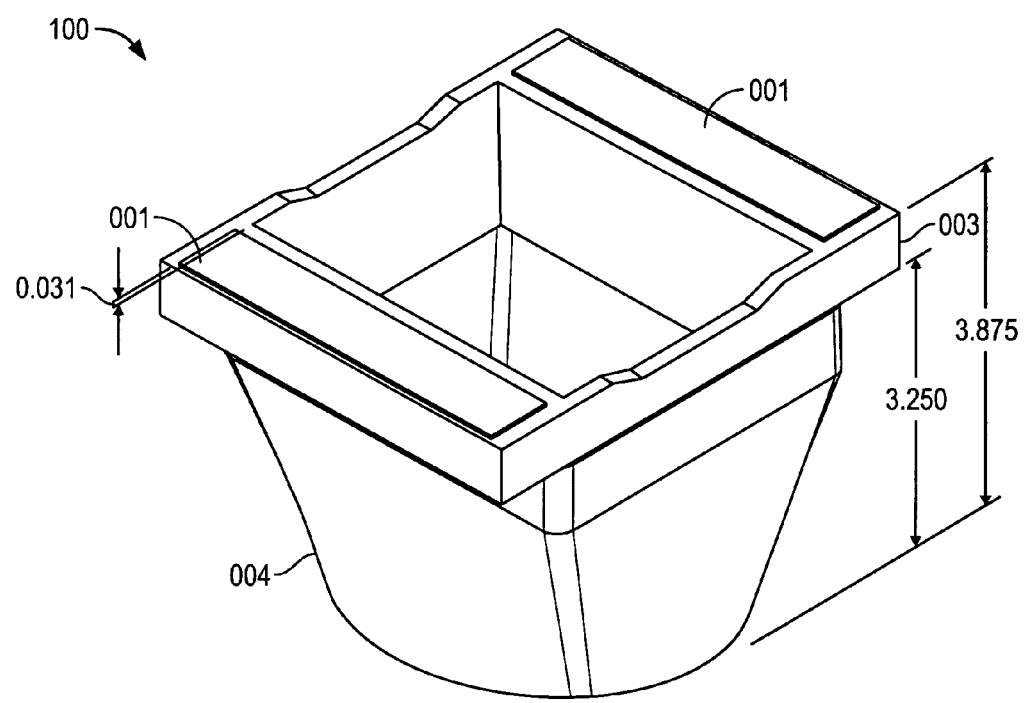
FIG. 2 is an isometric view of an embodiment of a safety tool for containing debris from electrical work.
Figure 3:
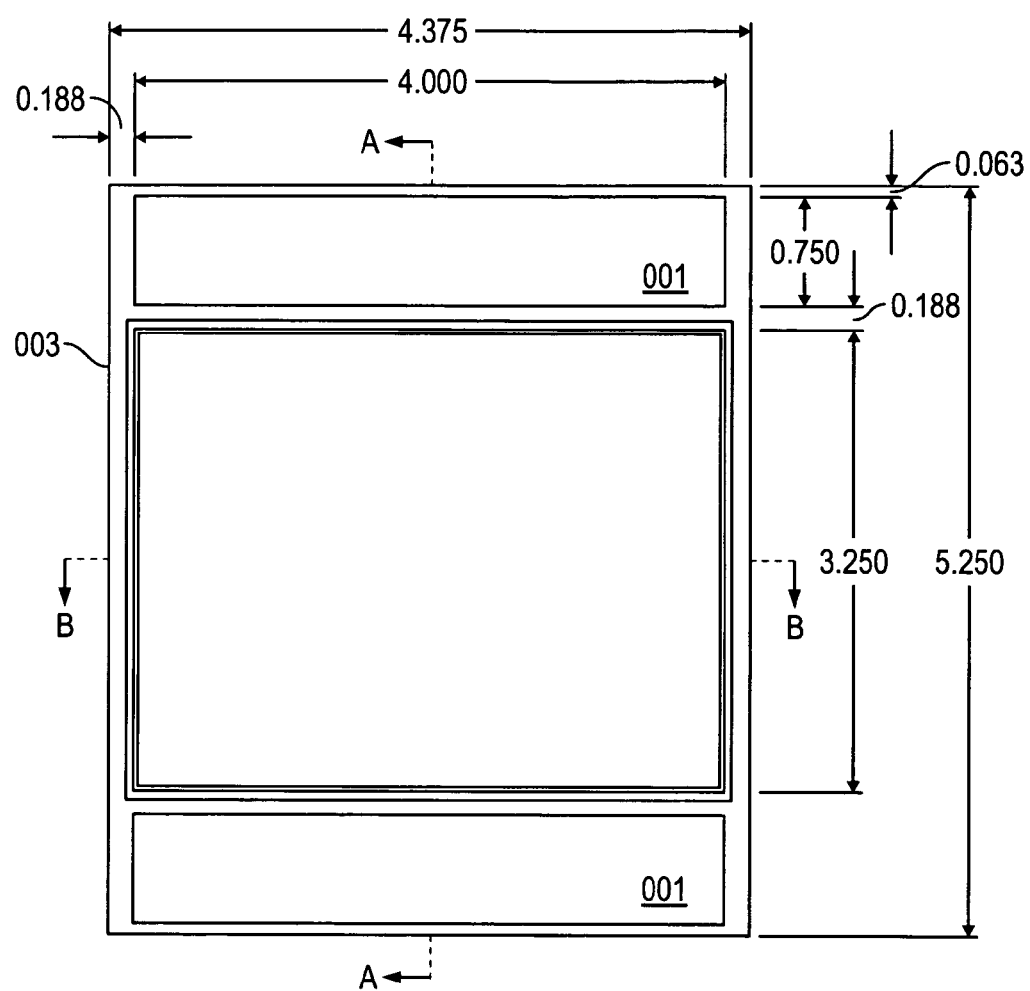
FIG. 3 is a top view of an embodiment of a safety tool for containing debris from electrical work.
Figure 4:
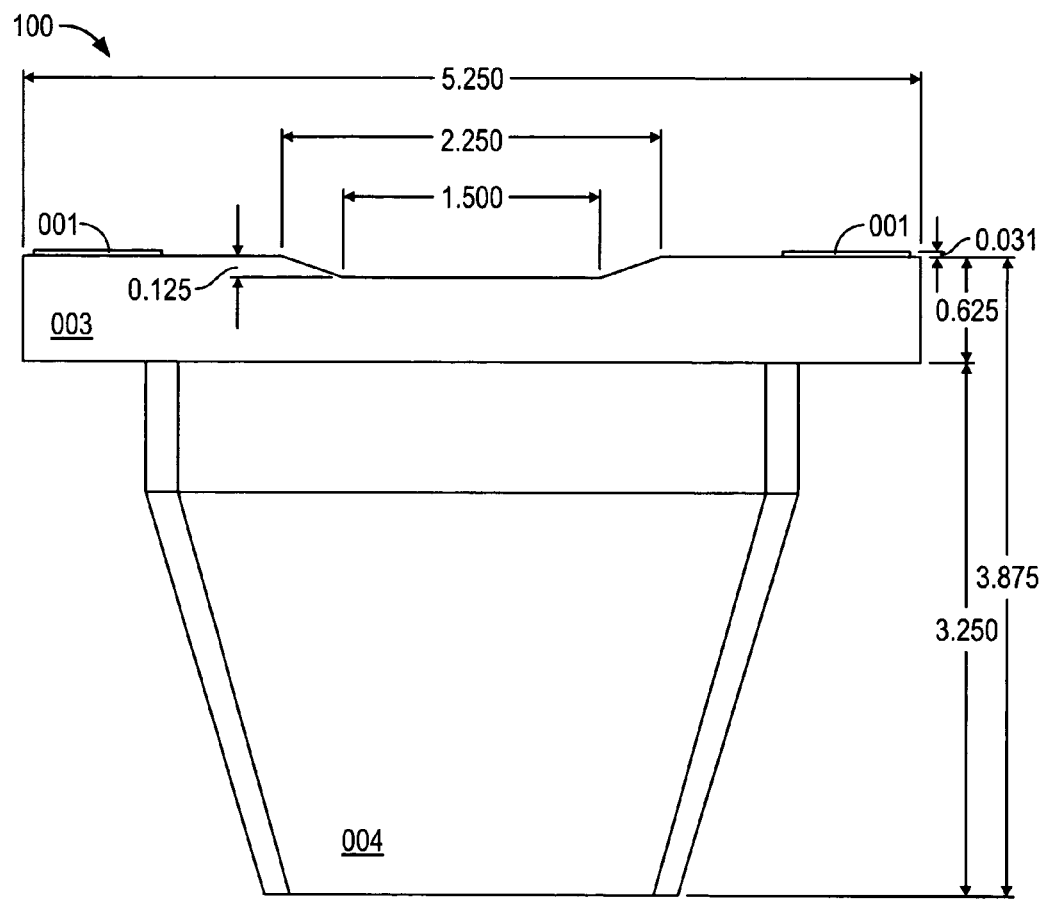
FIG. 4 is a side view of an embodiment of a safety tool for containing debris from electrical work.

FIGS. 2–4 are views of one embodiment of the safety tool 100 (FIG. 1) described herein. FIGS. 2–4 include dimensions associated with the safety tool 100; however, the dimensions illustrated are for purposes of example. Therefore, embodiments of safety tool 100 are not limited to such dimensions, but can be sized differently to meet varying needs.

FIG. 2 is an isometric view of an embodiment of a safety tool for containing debris from electrical work, showing magnets 001, frame 003 and outer sheath 004.

FIG. 3 is a top view of an embodiment of a safety tool for containing debris from electrical work, showing magnets 001 and frame 003.

FIG. 4 is a side view of an embodiment of a safety tool for containing debris from electrical work, showing magnets 001, frame 003 and outer sheath 004.

Operation of the Safety Tool

In the embodiment having a plurality of magnets 001, the magnets are configured in frame 003 to create a substantially solid and planar proximal surface on the tool 100. In such embodiment, the use of a plurality of magnets 001 allows for both ease in assembly, as well as mechanical flexibility in the tool in use situations in which space is limited. The magnets 001 and the magnet 005 are placed in such a way that similar poles are facing each other.

In use, tool 100 is placed inside the switchgear or other conductive surface and slid into the proper location. Magnets 001 secure the tool 100 in place. The tool 100 is positioned such that the inner bag 008 encompasses the area of the conductive surface at which a hole will be created. The tool 100 may be secured, via magnets 001, to a horizontal, vertical or angled surface. A drill or other hole-cutting mechanism is used to create an opening in the conductive surface. The magnet 005 attracts the metal debris and contains it for subsequent ease in disposal.

The tool 100 is flexible, so that it can be fit into space-limited areas, and still provides ultimate protection to the operator. After the hole is created, the tool 100 is removed from the switchgear. Debris is safely secured in the bottom of the tool 100, with a negligible chance of contacting any electrical/electronic equipment within the switchgear. The inner bag 008 is pulled upward to remove the inner bag 008 from the outer sheath 004, and the debris can then be easily and safely disposed of. In one embodiment, the inner bag 008 is constructed to be disposable so that the operator can simply discard the entire inner bag 008, rather than emptying the inner bag 008 of the contained debris.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, although embodiments of the invention are described in reference to use with electrical/electronic equipment, use of the embodiments are not limited to such particular fields. Furthermore, although embodiments of the invention are described in reference to use with "live" or "hot" switchgear, use of the embodiments are not limited to switchgear nor are they limited to use with live equipment.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. An apparatus for containing debris, the apparatus comprising:

a non-conductive outer sheath having an open proximal end and a bottom;

one or more first magnets coupled near the proximal end of the outer sheath;

one or more second magnets, positioned between the bottom of the outer sheath and a bottom of a removable inner bag, to attract metallic debris that enters the removable inner bag; and the removable inner bag having an open proximal end, wherein the inner bag is disposed within the outer sheath, and wherein the inner bag is configured to contain debris.

2. The apparatus of claim 1, further comprising:
a frame having a proximal portion and distal portion with an opening through the proximal and distal portions;
wherein the open proximal end of the outer sheath is coupled to the frame and the bottom of the outer sheath extends away from the frame, and wherein the open proximal end of the outer sheath encompasses the opening of the frame;
wherein the open proximal end of the inner bag encompasses the opening of the frame; and
wherein the one or more first magnets are coupled near the proximal portion of the frame.

3. The apparatus of claim 2,
wherein the one or more first magnets includes a plurality of first magnets, and
wherein at least two of the plurality of first magnets are located on substantially opposing sides of the opening of the frame.

4. The apparatus of claim 3, further comprising:
a metal sheet configured between a magnet of the plurality of first magnets and a respective recess within which the magnet is disposed.

5. The apparatus of claim 3,
wherein the frame includes a first recess and a second recess; and
wherein at least one magnet of the plurality of first magnets is disposed in the first recess and at least one magnet of the plurality of first magnets is disposed in the second recess.

6. The apparatus of claim 2, wherein the one or more first magnets are configured such that the magnetic forces associated with the one or more first magnets provide magnetic attraction in a direction from the proximal portion of the frame to the distal portion of the frame.

7. The apparatus of claim 2, wherein the frame is an injection-molded plastic piece.

8. The apparatus of claim 1, further comprising:
a magnet housing coupled to the outer sheath near the bottom of the outer sheath; and
wherein the one or more second magnets are housed by the magnet housing.

9. The apparatus of claim 8, wherein the one or more second magnets have a proximal side and a distal side, the apparatus further comprising:
a magnetic shield configured between the distal side of the one or more second magnets and the magnet housing.

10. The apparatus of claim 8, wherein the magnet housing is an injection-molded plastic piece.

11. The apparatus of claim 1, wherein the outer sheath is tapered from the proximal end to the bottom.

12. The apparatus of claim 1, wherein the outer sheath is leather.

13. The apparatus of claim 1, wherein the inner bag is in contact with at least one of the one or more second magnets.

* * * * *